United States Patent
Hsu

(10) Patent No.: US 8,426,009 B2
(45) Date of Patent: Apr. 23, 2013

(54) COMPOSITE SHEET STRUCTURE

(76) Inventor: Chih-Lin Hsu, Taipei (TW)

( * ) Notice: Subject to any disclaimer, the term of this patent is extended or adjusted under 35 U.S.C. 154(b) by 418 days.

(21) Appl. No.: 12/764,370

(22) Filed: Apr. 21, 2010

(65) Prior Publication Data

US 2010/0203349 A1  Aug. 12, 2010

Related U.S. Application Data

(63) Continuation of application No. 12/153,740, filed on May 23, 2008, now abandoned.

(51) Int. Cl.
*B32B 3/28* (2006.01)
*B32B 3/30* (2006.01)
*B32B 15/04* (2006.01)

(52) U.S. Cl.
USPC ........... 428/174; 428/181; 428/184; 428/457; 428/461

(58) Field of Classification Search .......... 428/174, 428/181, 182, 183, 184, 186, 457, 458, 459, 428/460, 461, 462, 603, 604; 52/783.11, 52/783.17, 783.14
See application file for complete search history.

(56) References Cited

U.S. PATENT DOCUMENTS 5,985,457 A * 11/1999 Clifford .................. 428/416
6,599,645 B2 * 7/2003 Wittebrood .............. 428/654

* cited by examiner

*Primary Examiner* — Catherine A Simone
(74) *Attorney, Agent, or Firm* — Rosenberg, Klein & Lee

(57) ABSTRACT

A composite sheet structure is presented, and includes a core layer and two surface layers. Each surface layer has a plurality of metallic sheets. The metallic sheets bond with one another. The core layer and the surface layers bond with each other, and the core layer is sandwiched between the two surface layers. In comparison to conventional single type/solid piece of building material, the present invention results in a dramatic cost reduction in various building industry. With the up-to-date technology, the strength of metallic composite sheet remains within structural grade parameter and meets related specifications. Manufacturers are benefited from the cheaper metallic sheet in the composition while enjoying the same quality look of the outer layer.

4 Claims, 14 Drawing Sheets

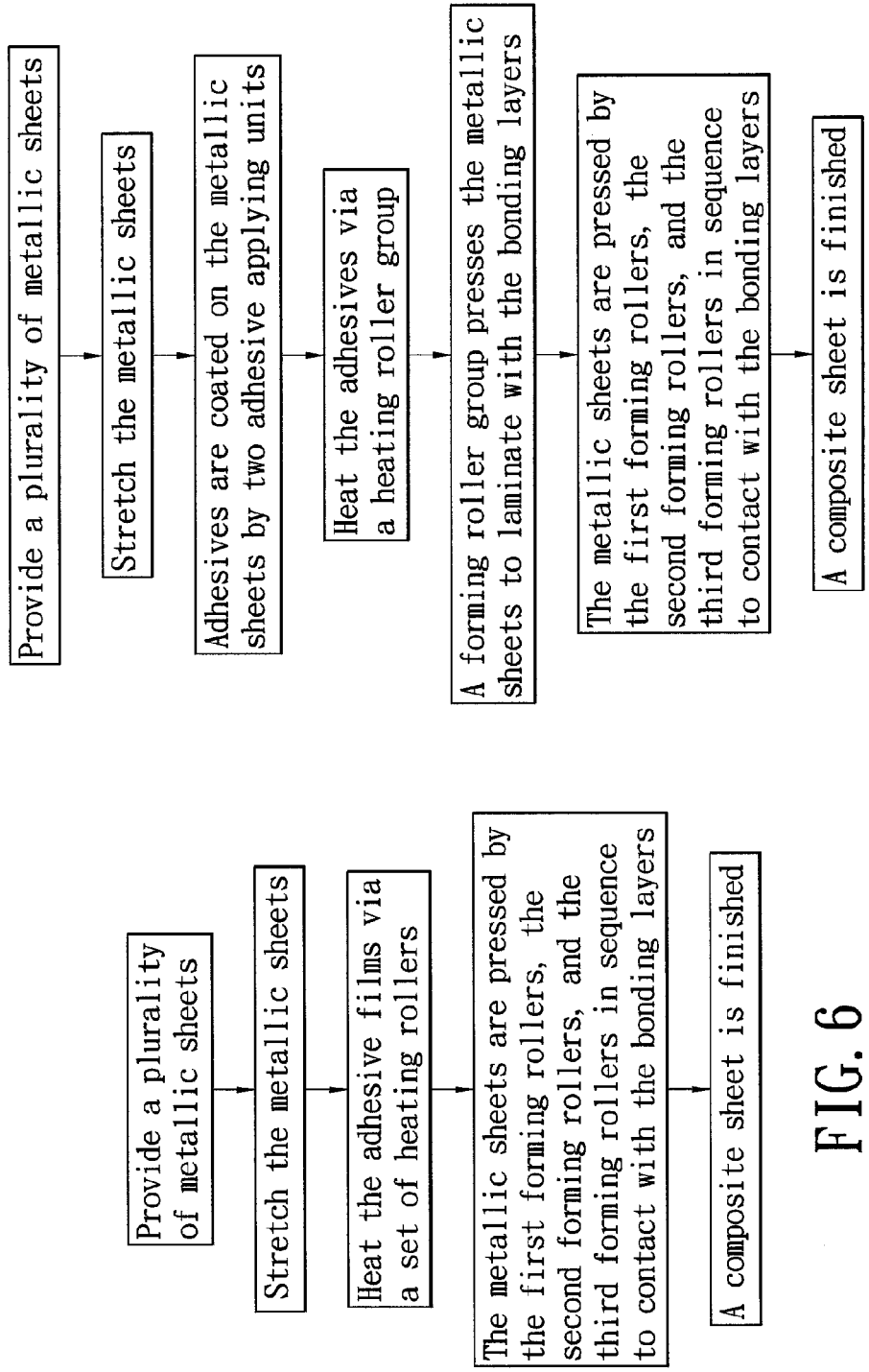

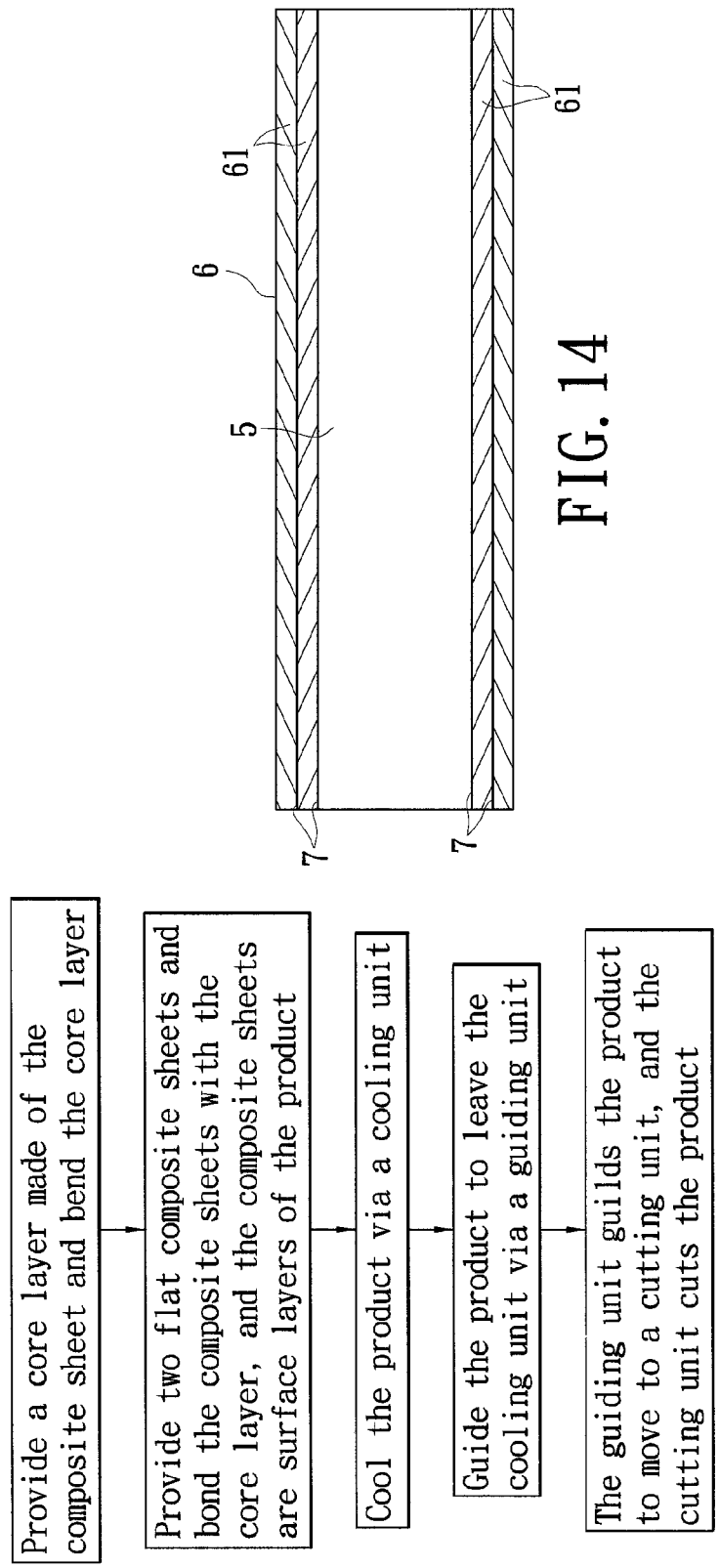

COMPOSITE SHEET STRUCTURE

CROSS REFERENCE TO RELATED APPLICATION

This application is a continuation application claiming only subject matter disclosed in prior application of U.S. application Ser. No. 12/153,740 filed on May 23, 2008 directed to 35 USC 120. The contents of all of which are incorporated herein their entirety.

BACKGROUND OF THE INVENTION

1. Field of the Invention

The present invention relates to a kind of composite sheet structure that can be used as building and industrial material.

2. Description of the Related Art

Please refer to FIG. 1, representing a typical structure plan of traditional composite sheet, wherein the traditional composite sheet represents one kind of exterior cladding material in the building industry. The process of producing a traditional composite sheet includes the steps of (a) putting some plastic materials into an extruder which extrudes and heats the plastic materials (i.e. resin) until the plastic materials are melted; (b) the melted plastic materials are transported to a mold to become a flat core layer 1a of the composite sheet; (c) provide two metallic surfaces layers 2a to bond with the core layer 1a.

As shown in FIG. 1, the structure of a traditional composite sheet includes the core layer 1a, and the two surface layers 2a. The core layer 1a is sandwiched between the two surface layers 2a.

Because quantities of easily accessible natural resources (specifically metals) on Earth are decreasing, the cost of the composite sheet made of exotic metals will be more and more expensive. However, if we simply decrease the quantities of the more expensive metals for the metallic surface layers 2a and attempt to reduce the cost of the composite sheet in this simple fashion, the strength of the composite sheet would suffer and may not be enough to reach industry safety regulations.

SUMMARY OF THE INVENTION

One particular aspect of the present invention is to provide a composite sheet structure, the strength of the composite sheet not only can satisfy the industry safety regulation, but also the weight of the composite sheet can be reduced compare to traditional composite sheet, and the cost of producing the composite sheet of the present invention can be effective reduced.

The composite sheet structure includes a core layer and two surface layers, wherein each surface layer has a plurality of metallic sheets, the metallic sheets bond with one another, the core layer and the surface layers bond with each other, and the core layer is sandwiched between the two surface layers.

This invention has several advantages: by carefully choosing the composite materials used to produce the surface layers, and coupled with the present invention, thereby reducing the quantity requirement for the more expensive metal on the surface layers and the core layer of the composite sheet, and due to the bonding method of the present invention the strength of the composite sheet will still satisfy industry safety regulation and the cost of producing the composite sheet can be effectively reduced. The weight of the composite sheet can be light (due to the fact that the more expensive metals are generally heavier), so that it is very convenient for fabricator and installer to assemble many of the composite sheets with each other.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein enable a further understanding of the invention. Brief introduction of the drawings are as follows:

FIG. 6 is a process for producing the composite sheet structure of the third embodiment of the present invention.

FIG. 7 is a process for producing the composite sheet structure of the forth embodiment of the present invention.

FIG. 13 is a process for producing the product of the composite sheet structure of the fifth embodiment of the present invention.

FIG. 14 is a plan of the product of the composite sheet structure of the first embodiment of the present invention.

DETAILED DESCRIPTION OF THE PREFERRED EMBODIMENTS

Figure 1:
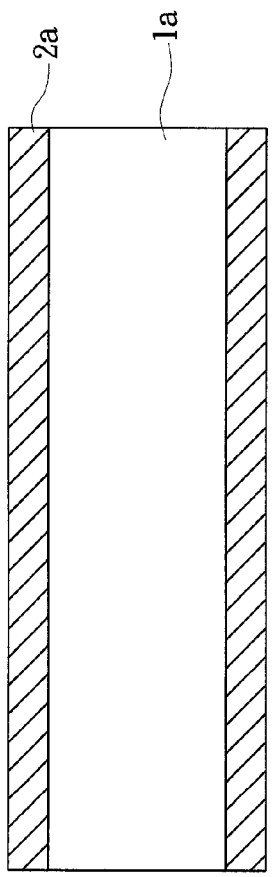
FIG. 1 is a plan of the structure of the traditional composite sheet.
Figure 2:
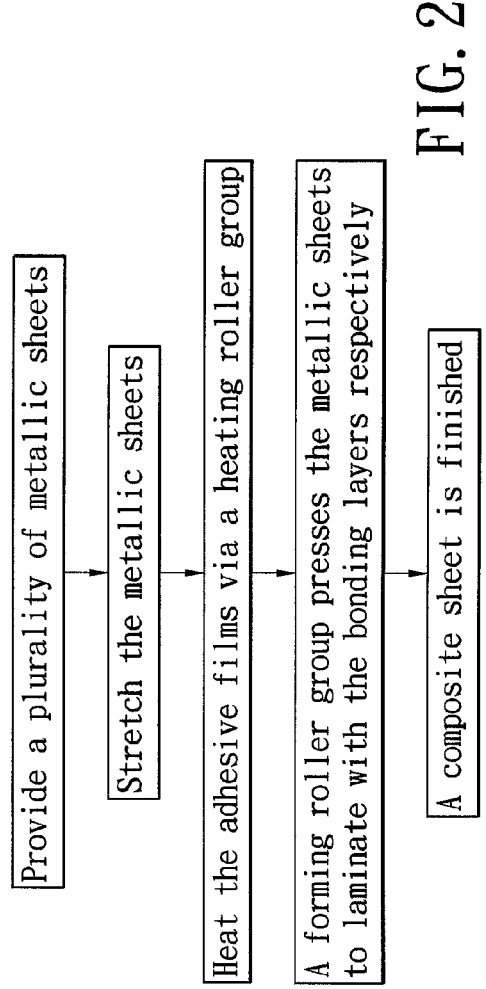
FIG. 2 is a process for producing the composite sheet structure of the first embodiment of the present invention.
Figure 3:
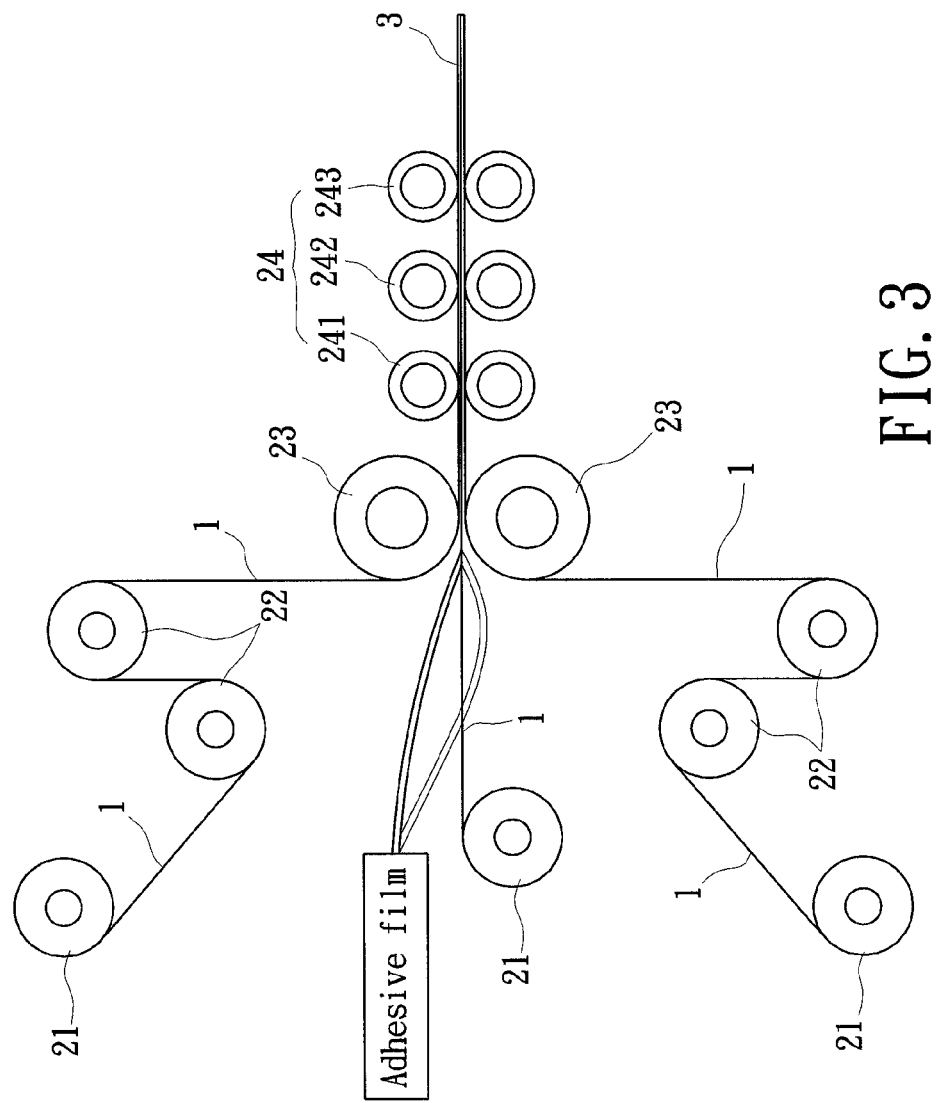
FIG. 3 is a schematic view of the manufacturing equipments with respect to FIG. 2.

As shown in FIG. 2 and FIG. 3. A first embodiment of a process for producing a composite sheet is presented, and the process includes the steps of:

(a) provide a plurality of metallic sheets 1 (top, middle, and bottom metallic sheets 1), wherein the metallic sheets 1 are coiled around a coiling roller group 21, and the metallic sheet 1 are made of aluminum, copper, steel, zinc, or titanium.

(b) Uncoil the metallic sheets 1 coiled around the coiling roller group 21 (uncoiling can be done by motor (not shown) or any other power generating equipment, which is beyond the scope of the present invention), then as the metallic sheets are uncoiling, the top and bottom metallic sheets 1 are passed through a stretching roller group 22, and the stretching roller group 22 extends, stretches, and flattens the top and bottom metallic sheets 1.

(c) the middle metallic sheets 1 have top and bottom surfaces (here on now referred as contact surfaces) respectively, place a plurality of adhesive on the contact surfaces of the middle metallic sheets 1, heat the adhesive films via a set of heating rollers 23 to form a plurality of bonding layers on the contact surfaces respectively.

(d) the metallic sheets 1 are passed through a forming roller group 24; the forming roller group 24 includes a pair of first forming rollers 241, a pair of second forming rollers 242, and a pair of third forming rollers 243. The metallic sheets 1 are pressed by the first forming rollers 241, the second forming rollers 242, and the third forming rollers 243 in sequence. The forming roller group 24 presses the metallic sheets 1 against the bonding layers in sequence, the metallic sheets 1 bond with each other via the bonding layers, and a composite sheet 3 having a plurality of metallic layers is finished. Though the metallic sheets 1 are not made of the more expensive metals, the strength of the composite sheet 3, due to the bonding process, would still satisfy industry safety regulation. In one embodiment, the top, middle, and bottom metallic sheets 1 in FIG. 3 are made of different materials. Generally, the metallic sheets 1 that would eventually be the "presenting surface" or "top surface," will be made of the more expensive metal, whereas the middle and bottom metallic sheets 1 would be made of lighter and cheaper metal.

Figure 4:
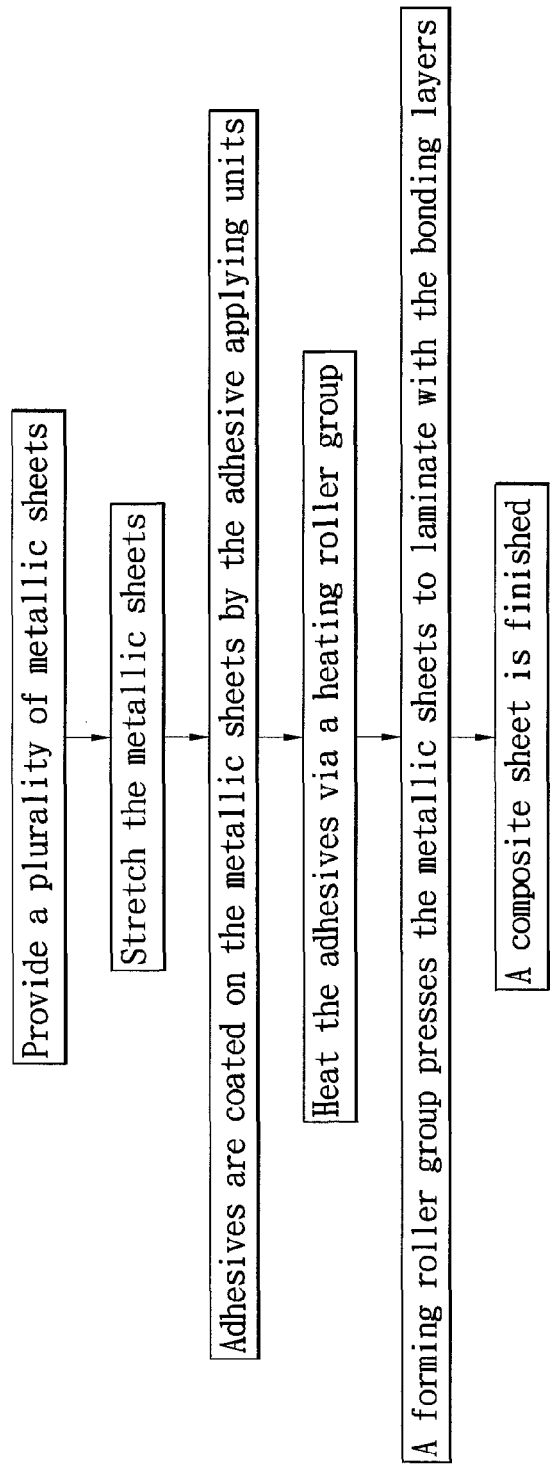
FIG. 4 is a process for producing the composite sheet structure of the second embodiment of the present invention.
Figure 5:
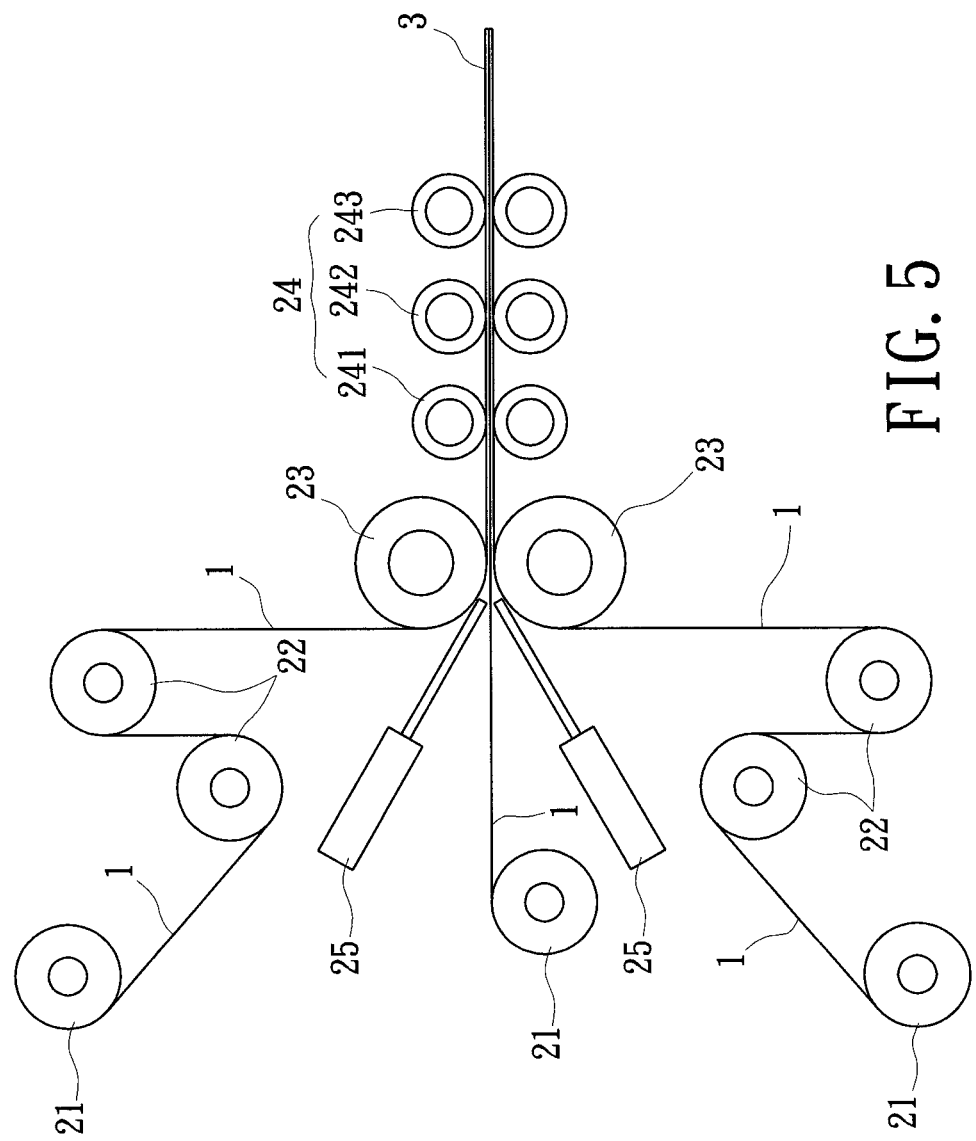
FIG. 5 is a schematic view of the manufacturing equipments with respect to FIG. 4.

As shown in FIG. 4 and FIG. 5, represent the second embodiment of the present invention. Similar to FIGS. 2 and 3, except that a plurality of adhesives are coated on the contact surfaces of the middle metallic sheets 1 by two adhesive applying units 25 (only 1 shown) with different vertical positions, and the adhesives are bonding layers of the composite sheet 3.

The kinds of the adhesives used are not restricted, as long as the adhesives can bond the metallic sheets 1 with one another securely. The temperature of the set of heating rollers 23 depends on the adhesive applying units 25, and only needs to be high enough for proper adhesive bonding.

FIG. 6 is a process for producing the composite sheet structure of the third embodiment of the present invention. The bonding layers are formed by the set of heating rollers 23. The radius of each third forming roller 243 is longer than the radius of each second forming roller 242, and the radius of each second forming roller 242 is longer than each radius of the first forming roller 241. The metallic sheets 1 are pressed by the first forming rollers 241, the second forming rollers 242, and the third forming rollers 243 in sequence to contact with the bonding layers respectively, and the metallic sheets 1 bond with each other via the bonding layers.

FIG. 7 is representing a process for producing the composite sheet structure of the fourth embodiment of the present invention. The bonding layers are formed by the two adhesive applying units 25. The radius of each third forming roller 243 is longer than radius of each second forming roller 242, and the radius of each second forming roller 242 is longer than the radius of each first forming roller 241. The metallic sheets 1 are pressed by the first fanning rollers 241, the second forming rollers 242, and the third forming rollers 243 in sequence to contact with the bonding layers, and the metallic sheets 1 bond with each other via the bonding layers. Furthermore, we can bond the metallic sheets 1 with each other by a metallic bonding process via heat conduction.

Figure 8:
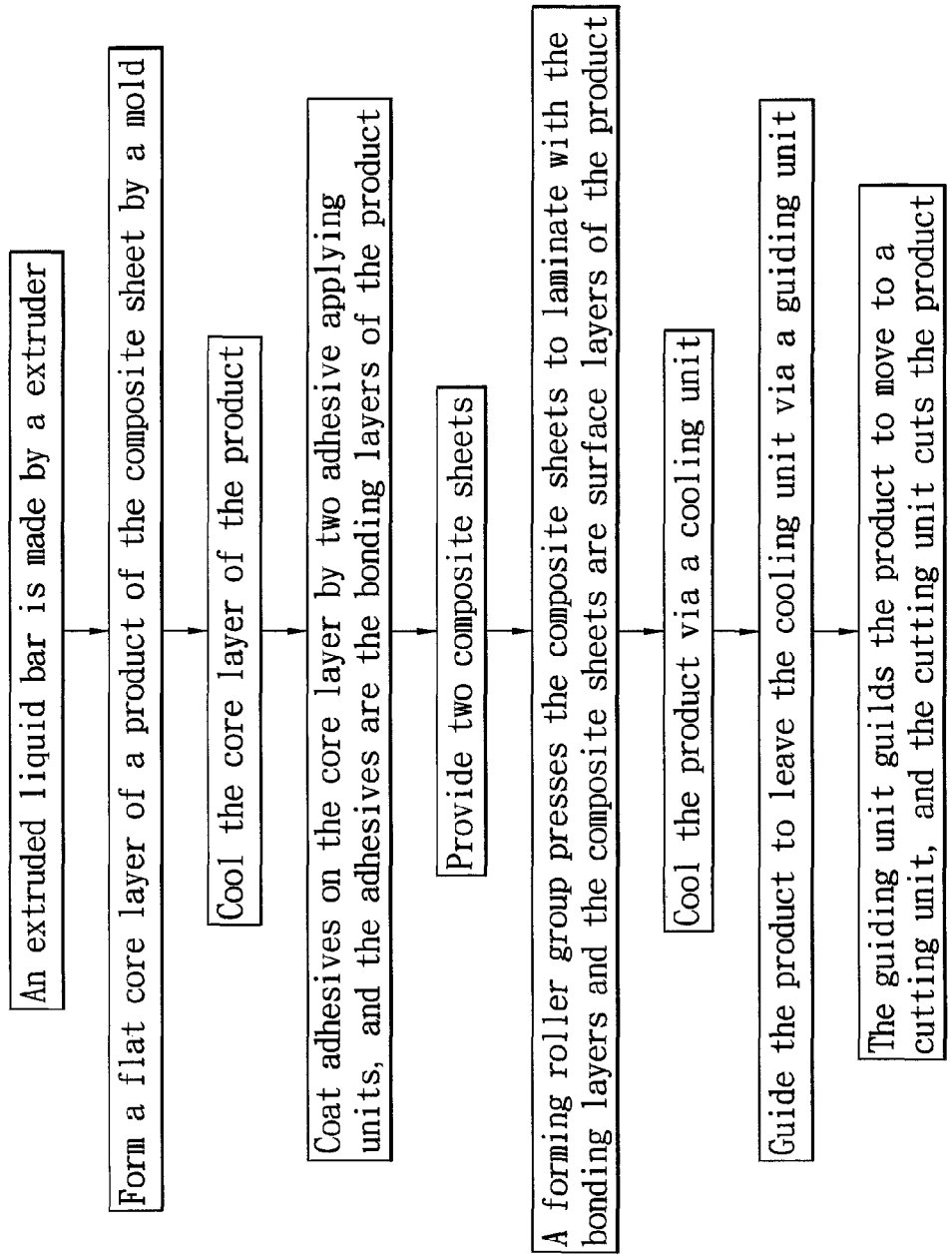
FIG. 8 is a process for producing the product of the composite sheet structure of the first embodiment of the present invention.
Figure 9:
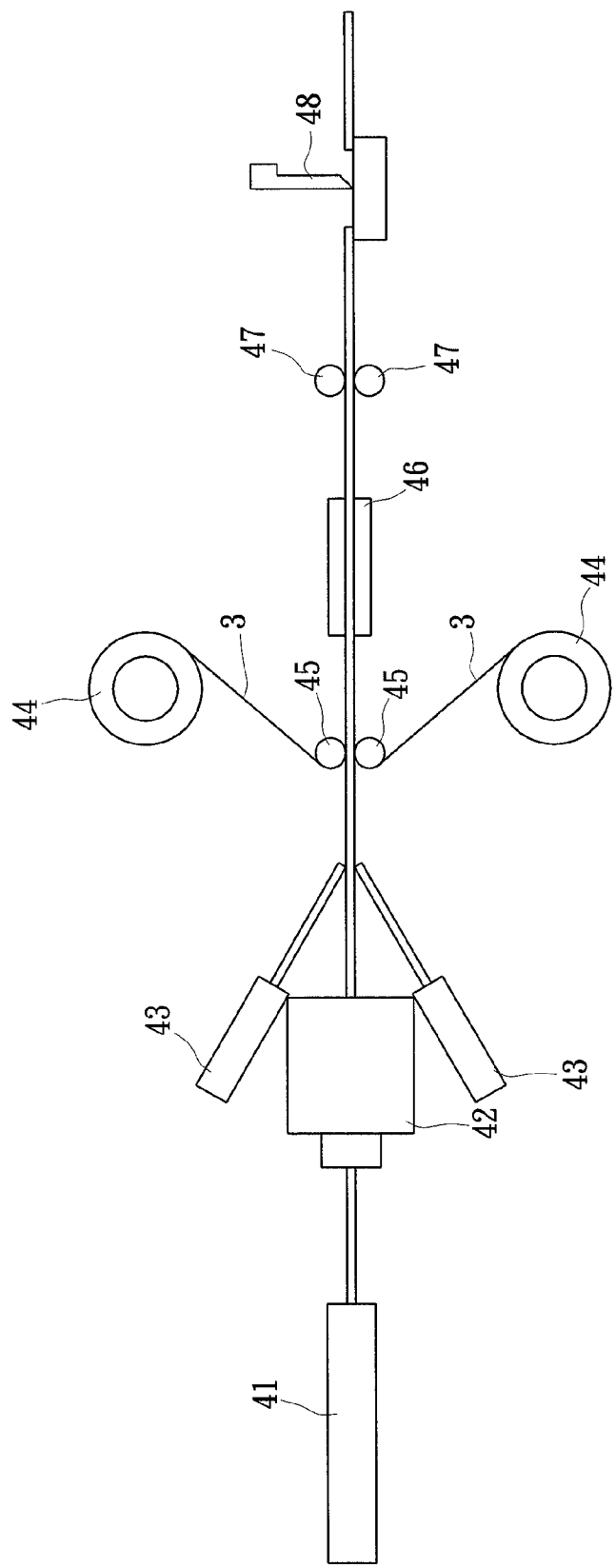
FIG. 9 is a schematic view of the manufacturing equipments with respect to FIG. 8.

As shown in FIG. 8 and FIG. 9. A first embodiment for a process for producing a product of the composite sheet structure of the present invention is presented, and the process includes the steps of:

(a) Mix some foaming agents and blowing promoters with a substrate, and then put the substrate which is mixed with the foaming agents and the "blowing promoters" (A raw material for the manufacture of plastics, for example, urea-formaldehyde resin) into an extruder 41. The extruder 41 grinds, heats and extrudes the substrate to become an extruded liquid bar, and then the liquid bar are transported to a mold 42 to be flatten and become a core layer of the product, and then the core layer is cooled via a cooling apparatus (not shown). Wherein the kind of the substrate, the kinds of the foaming agents and the blowing promoters are not restricted. The substrate can be made of polyethylene, or polypropylene, or ethylene-vinyl acetate copolymer, the foaming agents can be made of diazenedicarboxamide, and the blowing promoter can be made of a zinc oxide or stearin cadmium.

(b) Apply adhesives (polymer film or liquid adhesive) onto the surfaces of the core layer by two adhesive applying units 43 with different feeding positions (top and bottom), the adhesives are the lamination agent of the product, and the kinds of the adhesives are not restricted.

(c) Provide two composite sheets 3, and the two composite sheets 3 are coiled around two coiling rollers 44 with different vertical positions (top and bottom). Uncoil the two composite sheets 3, and the composite sheets 3 are transported to a forming roller group 45. The forming roller group 45 presses the composite sheets 3 to contact with the bonding layers, the composite sheets 3 are laminated to the core layer, the core layer is sandwiched between the two composite sheets 3, and the two composite sheets 3 are two surface layers of the product respectively. Furthermore, the two surface layers can be coated with many colors.

(d) cool the product via a cooling unit 46.

(e) guide the product to leave the cooling unit 46 via a guiding unit 47.

(f) the guiding unit 47 guilds the product to move to a cutting unit 48, and the cutting unit 48 cut the product to length.

Figure 10:
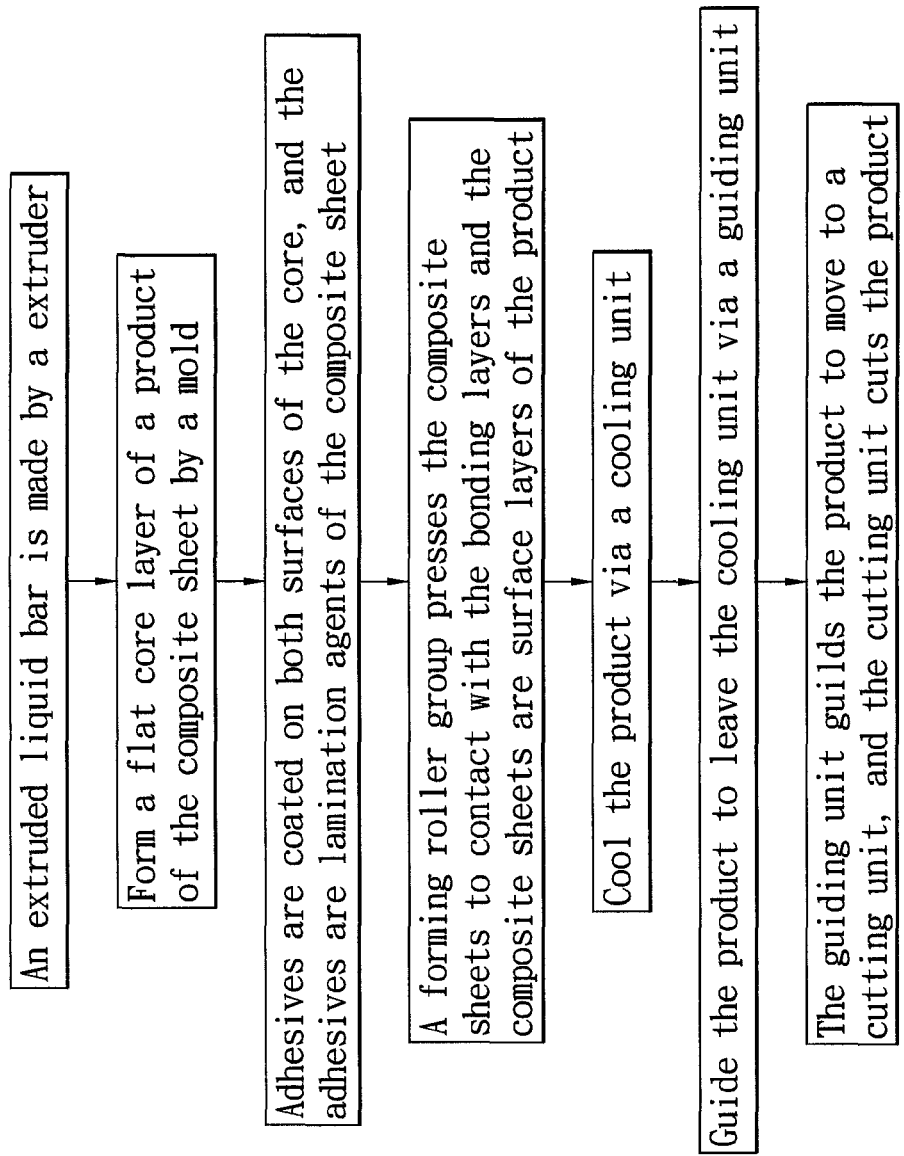
FIG. 10 is a process for producing the product of the composite sheet structure of the second embodiment of the present invention.

As shown in FIG. 10. A process for producing a composite sheet structure of the second embodiment is presented. The process of FIG. 10 is similar to that of FIG. 8 with the following difference regarding and in place of FIG. 8. Please view in conjunction with FIG. 9, providing an adhesive supply connecting with an adhesive shunt (not shown) which is between the mold 42 and the forming roller group 45. The adhesive shunt has two runners with different feeding positions (top and bottom). After the core layer is formed after the mold 42, the two runners output and coat the adhesives to both surfaces of the core. The adhesives are the lamination agents for surface metals of the product.

Figure 11:
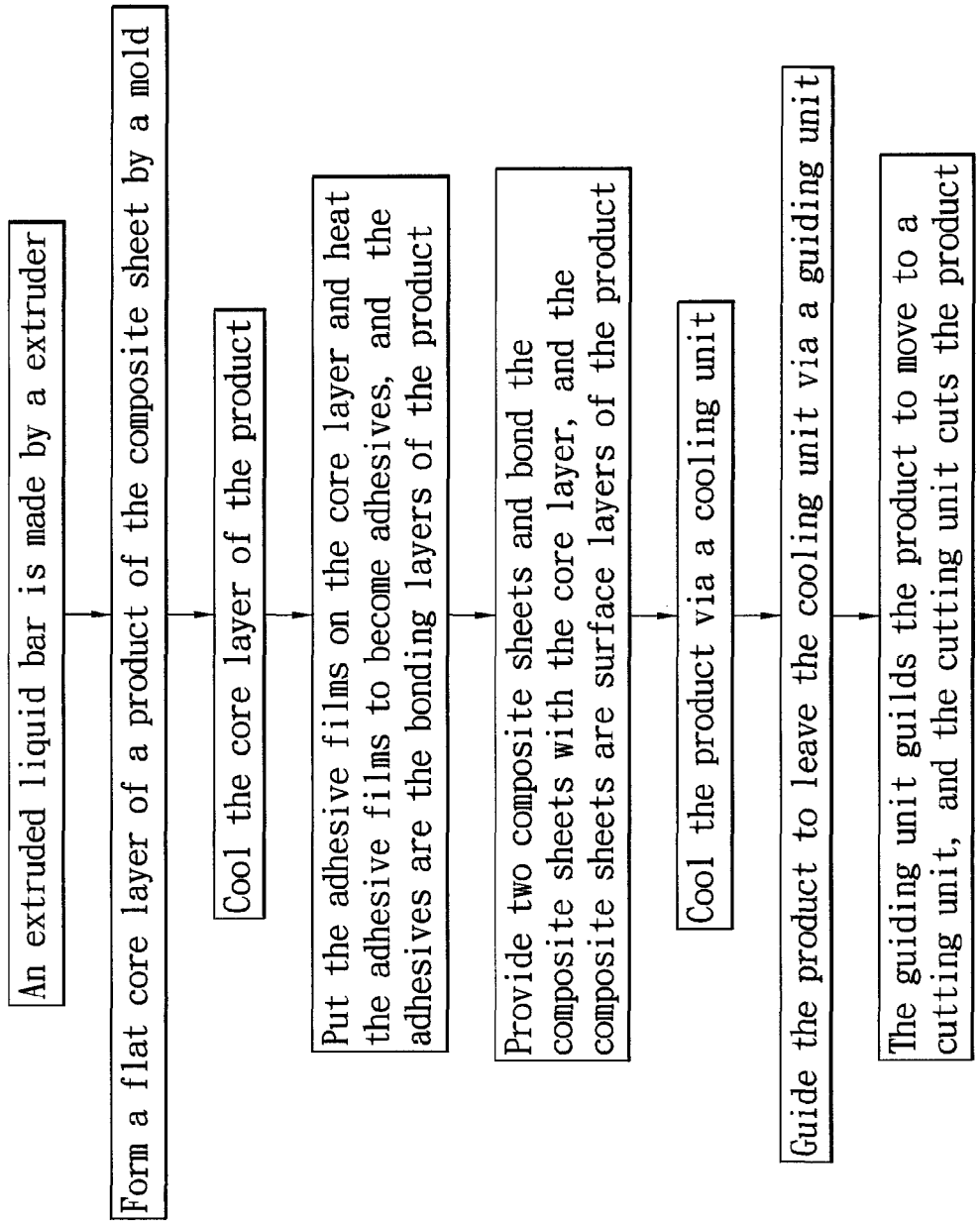
FIG. 11 is a process for producing the product of the composite sheet structure of the third embodiment of the present invention.
Figure 12:
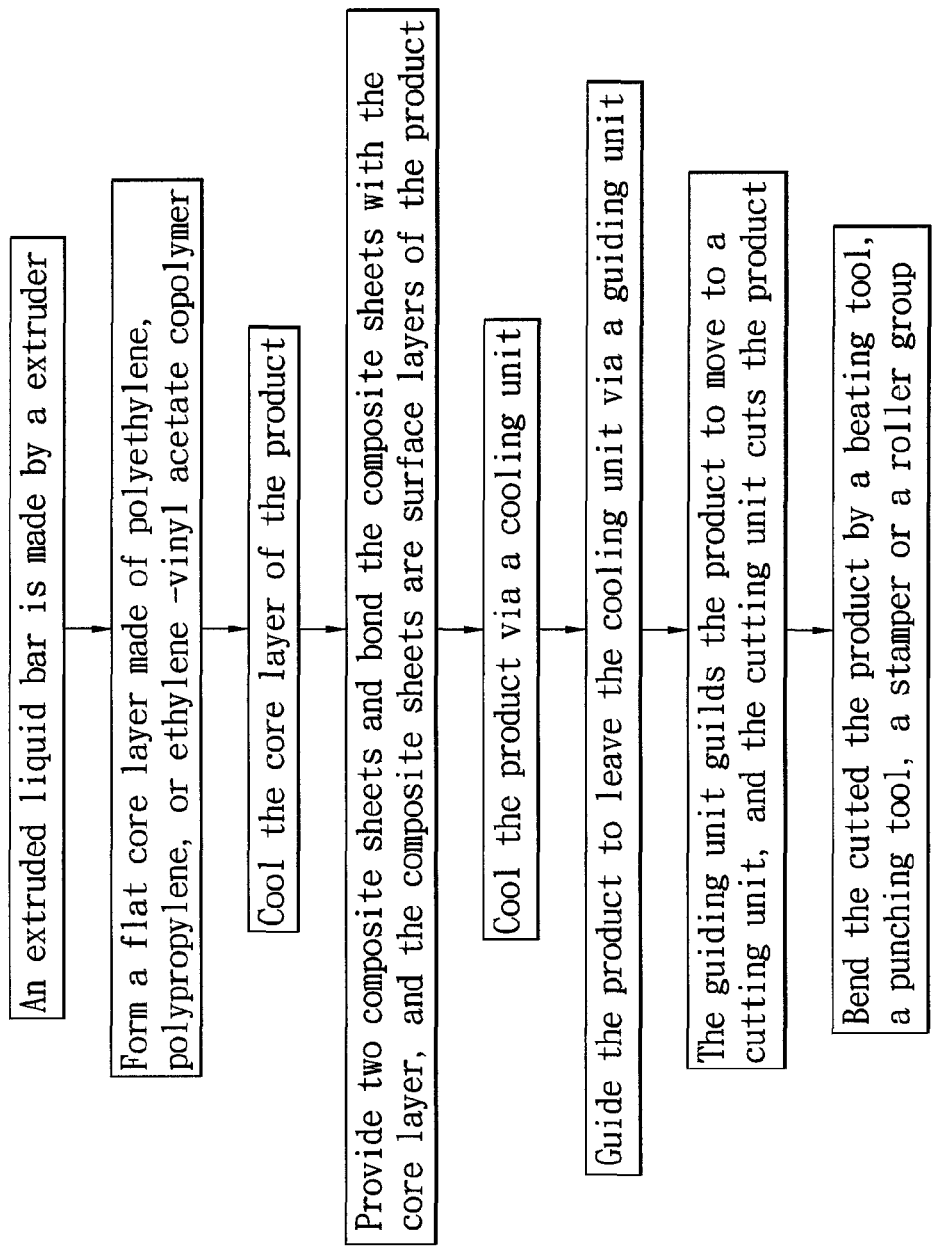
FIG. 12 is a process for producing the product of the composite sheet structure of the forth embodiment of the present invention.

As shown in FIG. 11. A process for producing a product of the composite sheet structure of the third embodiment according to the present invention is presented. Similar to steps of FIG. 8 with the following difference regarding and in place of FIG. 8 (*b*); please view in conjunction with FIG. 9: Provide some adhesive films. Place the adhesive films on the surfaces of the core layer, and heat and press the adhesive films by a set of heating rollers (could be forming roller group 45 or a separate set of heating rollers) having high temperature, and the adhesive films are found in-between the core & surface composite sheets to become adhesives, and the adhesives are the bonding layers of the product. As shown in FIG. 12. A process for producing a product of the forth embodiment of the composite sheets is presented: Provide the flat core layer made of polyethylene, or polypropylene, or ethylene-vinyl acetate copolymer. Provide the two flat surface layers made of composite sheets 3. Bend the core layer and the two surface layers by a beating tool, a punching tool, a stamper, or a roller group to become fretted or flexuous sheets, each metallic sheet 1 of the surface layers includes a plurality of first base portions, a plurality of second base portions, and a plurality of bending portion, each first base portion's vertical position is different from each second base portion's vertical position (for a visualization of what an embodiment of difference between base portion's vertical position, please see FIG. 15), and the bending portions are connected between the first base portions and the second base portions respectively, and the bonding power between the bended core layer and the bended surface layers are strengthened.

As shown in FIG. 13. A process for producing a product of the fifth embodiment of the composite sheets is presented. Provide the core layer made of the composite sheet 3. Provide the two flat surface layers made of composite sheets 3. Bend the core layer by the beating tool, the punching tool, the stamper or the roller group to become a fretted or flexuous sheet, and each metallic sheet 1 of the core layer includes a plurality of first base portions, a plurality of second base portions, and a plurality of bending portion, the bending portions are connected between the first base portions and the second base portions respectively, the vertical position of each first base portion is different from the vertical position of each second base portion. One of the two surface layers bonds with the first base portions, and the other surface layer bonds with the second base portions.

As shown in FIG. 14. A composite sheet structure is presented, and the composite sheet structure includes a core layer 5, two surface layers 6 and a plurality of bonding layers 7. The core layer 5 and the surface layers 6 are three flat sheets. The core layer 5 is sandwiched between the two surface layers 6, the core layer 5 is made of polyethylene, or polypropylene, or ethylene-vinyl acetate copolymer, and each surface layer 6 has a plurality of metallic sheets 61. The bonding layers 7 are made of adhesives. One of the bonding layers 7 are mounted between the metallic sheets 61 and the core layer 5, and the other bonding layers 7 are mounted between the two metallic sheets 61 and bonds the metallic sheets 61 and core layer 5 together.

Figure 15:
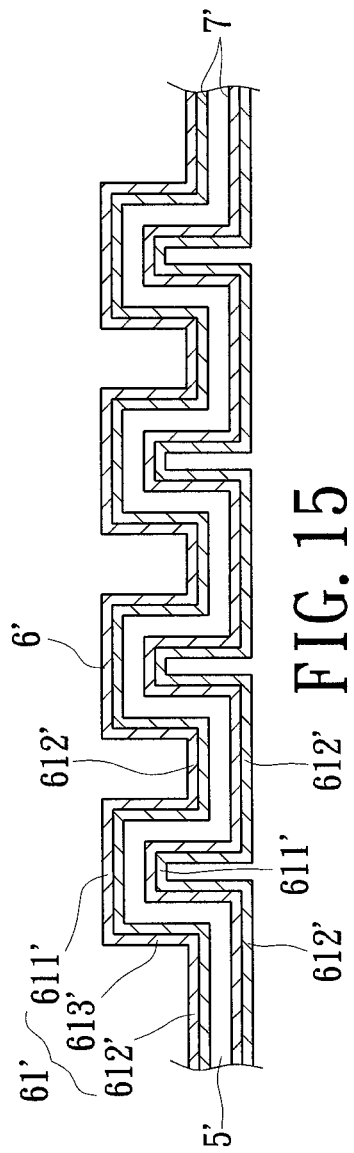
FIG. 15 is a plan of the composite sheet structure of the second embodiment of the present invention.

As shown in FIG. 15. A second embodiment of the composite sheet structure is presented. And the second embodiment of the composite sheet includes a core layer 5', two surface layers 6' and a plurality of bonding layers 7'. The core layer 5' and the surface layers 6' are fretted or flexuous sheets. The core layer 5' is sandwiched between the two surface layers 6', the core layer 5' is made of polyethylene, or polypropylene, or ethylene-vinyl acetate copolymer, and each surface layer 6' has a plurality of metallic sheets 61'. Each metallic sheet 61' includes a plurality of first base portions 611', a plurality of second base portions 612', and a plurality of bending portion 613', the bending portions 613' are connected between the first base portions 611' and the second base portions 612' respectively, the vertical position of each first base portion 611' is different from the vertical position of each second base portion 612'. The bonding layers 7' are made of adhesives. Two of the bonding layers 7' are mounted between the metallic sheets 61' and the core layer 5", and the other bonding layers 7' are mounted between the two metallic sheets 61', wherein the bonding layers 7' bonds the metallic sheets 61' and core layer 5' respectively.

Figure 16:
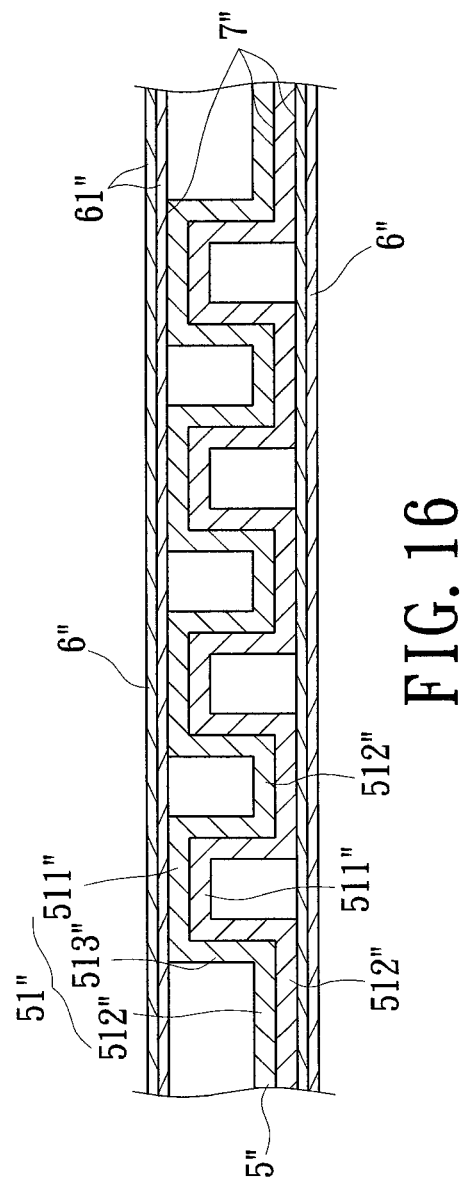
FIG. 16 is a plan of the composite sheet structure of the third embodiment of the present invention.

As shown in FIG. 16. A third embodiment of the composite sheet structure is presented. And the third embodiment of the composite sheet includes a core layer 5", two surface layers 6" and a plurality of bonding layers 7". The core layer 5" is a flexuous sheet. The core layer 5" is sandwiched between the two surface layers 6", the core layer 5" has a plurality of metallic sheets 51", and each metallic sheets 51" includes a plurality of first base portions 511", a plurality of second base portions 512", and a plurality of bending portion 513", the bending portions 513" are connected between the first base portions 511" and the second base portions 512" respectively, the vertical position of each first base portion 511" is different from the vertical position of each second base portion 512" (in the shape of a square wave function as can be seen from FIG. 16). The surface layers 6" are two flat sheets, and each surface layer 6" has a plurality of metallic sheets 61". The bonding layers 7" are made of adhesives. One of the bonding layers 7" are mounted between the metallic sheets 61" and the core layer 5", and the other bonding layers 7" are mounted between the metallic sheets 51" of the core layer 5" and the metallic sheets 61" of the surface layer 6" respectively.

Figure 17:
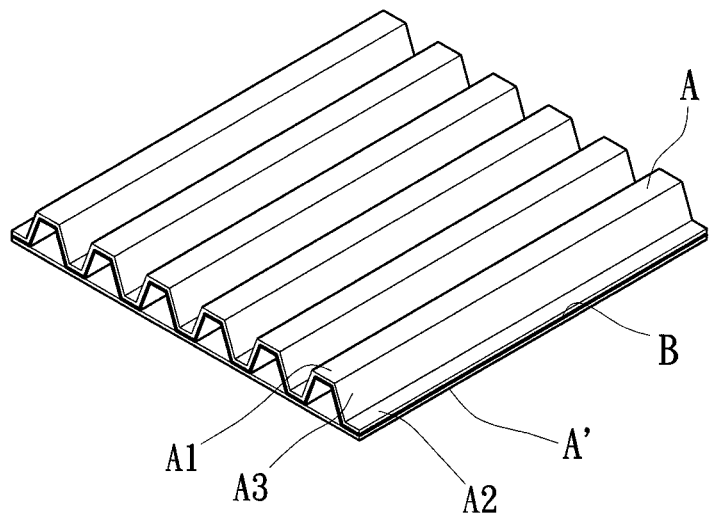
FIG. 17 is a perspective view of the composite sheet structure of the forth embodiment of the present invention.

As shown in FIG. 17. A forth embodiment of the composite sheet structure is presented, and the forth embodiment of the composite sheet includes two core layers A and a plurality of bonding layers B, the two core layers A are one flexuous sheet and one flat sheet, and each core layer A has a plurality of metallic sheets, and the metallic sheets bond with one another via some of the bonding layers B. The flexuous sheet includes a plurality of first base portions A1, a plurality of second base portions A2, and a plurality of bending portion A3, The bending portions A3 are connected between the first base portions A1 and the second base portions A2 respectively, the vertical position for all the first portions A1 and the second portions A2 are different, and the second base portions A2 bond with the flat sheet via one of the bonding layers B which is between the flexuous sheet and the flat sheet.

Figure 18:
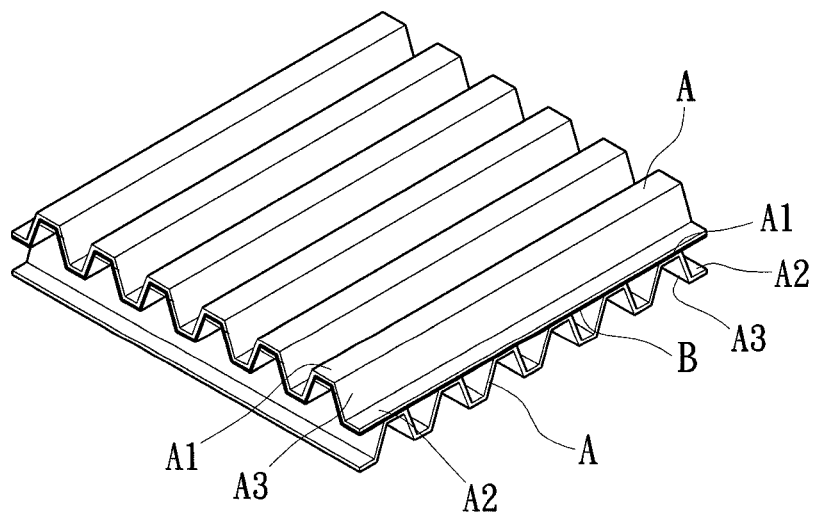
FIG. 18 is a perspective view of the composite sheet structure of the fifth embodiment of the present invention.

As shown in FIG. 18. A fifth embodiment of the composite sheet structure is presented. The number of the core layer A is two, and the core layers A are two flexuous sheets, and each core layer A are made of metallic sheets, and the metallic sheets bond with one another via some of the bonding layers B. Each flexuous sheet includes the first base portions A1, the second base portions A2, and the bending portion A3. The first base portions A1 of one of the flexuous sheets bond with the second base portions A2 of the other flexuous sheet via one of the bonding layers B which is between the two flexuous sheets.

Figure 19:
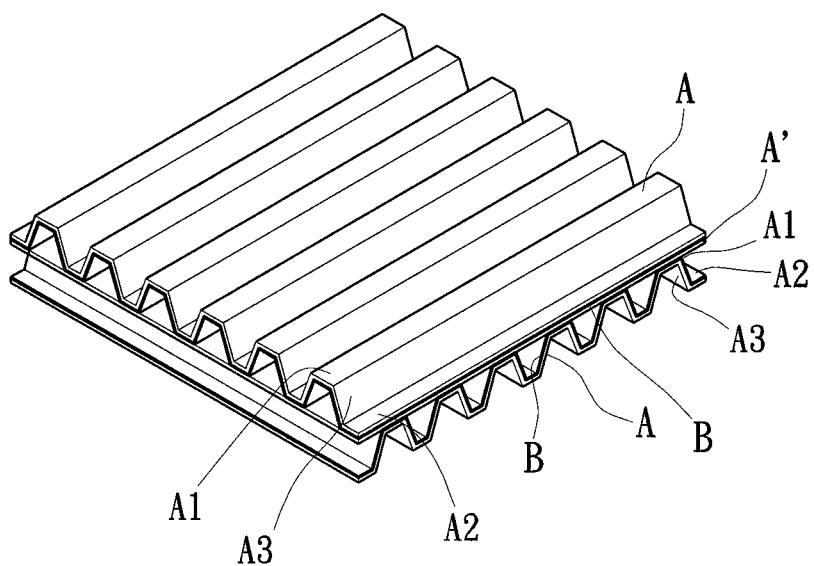
FIG. 19 is a perspective view of the composite sheet structure of the sixth embodiment of the present invention.

As shown in FIG. 19. A sixth embodiment of the composite sheet structure is presented, The number of the core layer A is three, and the core layers A are two flexuous sheets and one flat sheet. Each core layer A are made of metallic sheets, and the metallic sheets bond with one another via some of the bonding layers B. Each flexuous sheet includes the first base portions A1, the second base portions A2, and the bending portion A3. The first base portions A1 of one of the flexuous sheet and the second base portions A2 of the other flexuous sheet bond with the flat sheet via two of the bonding layers B which are among the two flexuous sheets and the flat sheet respectively.

The present invention has the following characteristics: Even the metallic sheets 1 are not generally made of more expensive metals, the strength of the composite sheet 3 should still satisfy industry safety regulation, the cost of producing the composite sheet 3 can be effectively reduced, the weight of the composite sheet 3 can be light when compared to using traditional method, so that it is very convenient for users to assemble many of the composite sheets 3.

The description above only illustrates specific embodiments and examples of the invention. The invention should therefore cover various modifications and variations made to the herein-described structures and applications of the invention provided if they fall within the scope of the invention as defined in the following appended claims.

What is claimed is:

1. A composite sheet structure, comprising:
a core layer; and
two surface layers, wherein each surface layer has a plurality of metallic sheets, the metallic sheets bond with one another, the core layer and the surface layers bond with each other, and the core layer is sandwiched between the two surface layers;
wherein the surface layers and the core layer are three flexuous sheets, the core layer is made of polymer materials, and each metallic sheet includes a plurality of first base portions, a plurality of second base portions, and a plurality of bending portion, the bending portions are connected between the first base portions and the second base portions respectively, the vertical position of each first base portion is different from the vertical position of each second base portion, forming a square wave shape.

2. The composite sheet structure as claimed in claim 1, wherein the core layer is made of polyethylene, or polypropylene, or ethylene-vinyl acetate copolymer.

3. The composite sheet structure as claimed in claim 1, further comprising a plurality of bonding layers which are mounted between the core layer and the surface layers, wherein the bonding layers bond the core layer and the surface layers with each other.

4. The composite sheet structure as claimed in claim 1, further comprising a plurality of bonding layers which are mounted between the metallic sheets, wherein the bonding layers are made of polymer adhesives, and the bonding layers bond the metallic sheets with each other.

* * * * *